United States Patent [19]

Hayashi et al.

[11] Patent Number: 4,605,164
[45] Date of Patent: Aug. 12, 1986

[54] CABIN HEATING ARRANGEMENT FOR VEHICLE HAVING EVAPORATIVE COOLED ENGINE

[75] Inventors: Yoshimasa Hayashi, Kamakura; Naoki Ogawa, Yokohama, both of Japan

[73] Assignee: Nissan Motor Co., Ltd., Yokohama, Japan

[21] Appl. No.: 777,019

[22] Filed: Sep. 17, 1985

[30] Foreign Application Priority Data

Sep. 29, 1984 [JP] Japan ................................ 59-204584

[51] Int. Cl.⁴ ............................................. B60H 1/02
[52] U.S. Cl. ...................................... 237/2 A; 237/6; 237/12.3 B; 123/41.08; 123/41.21
[58] Field of Search ............... 237/12.3 B, 12.3 A, 237/12.3 R, 2 A, 6, 40; 123/41.2, 41.21, 41.24, 41.25, 41.26, 41.27, 41.08

[56] References Cited

U.S. PATENT DOCUMENTS 2,413,770  1/1947  Knoy .......................... 123/41.21

*Primary Examiner*—Henry Bennett
*Attorney, Agent, or Firm*—Schwartz, Jeffery, Schwaab, Mack, Blumenthal & Evans

[57] ABSTRACT

A cabin heating arrangement is associated with an evaporative type engine cooling system and arranged so that immediately after a cold engine start when the cooling circuit of the engine is completely filled with liquid coolant coolant is inducted from a first port located immediately adjacent the most highly heated structure of the engine and pumped through the core of the cabin heater. Upon the coolant temperature rising sufficiently, coolant vapor is inducted form a second port located above the first one and introduced into the heater core.

15 Claims, 19 Drawing Figures

FIG.4

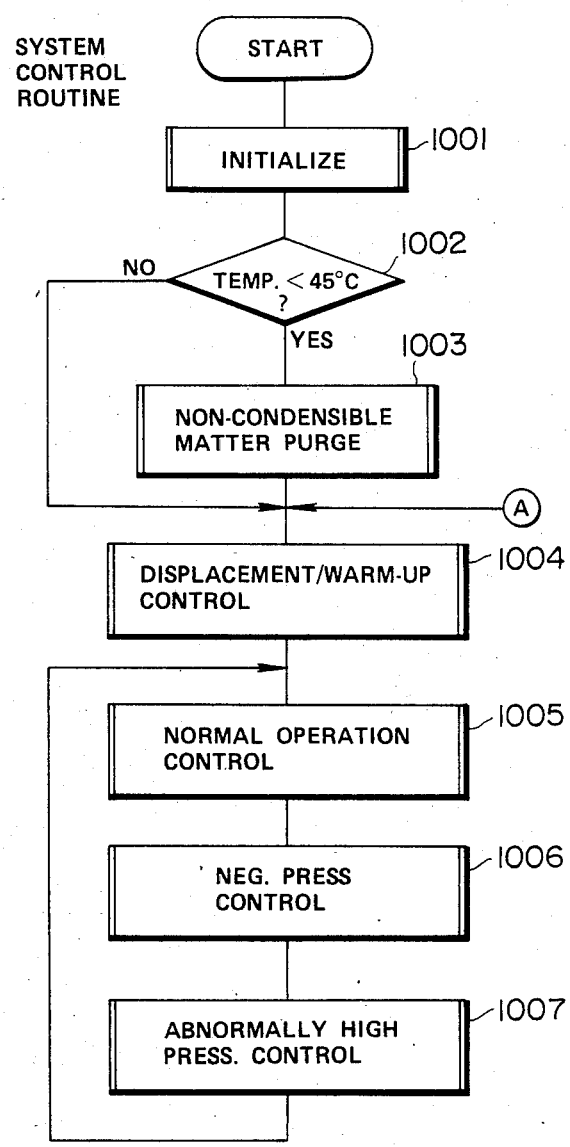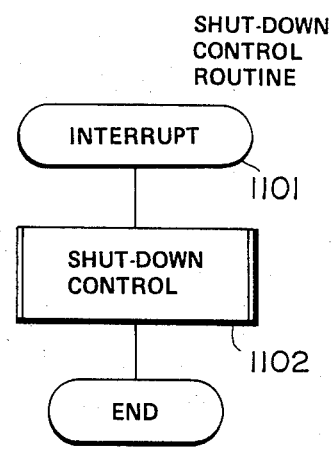

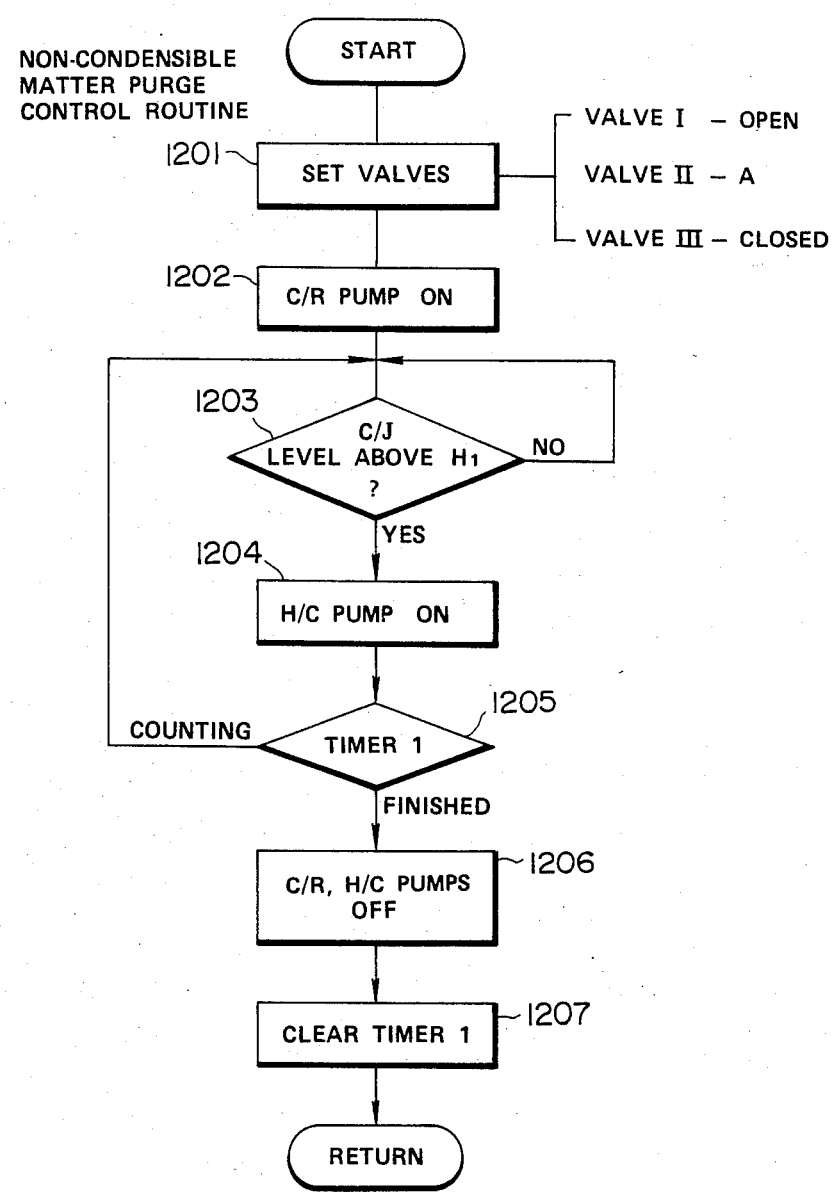

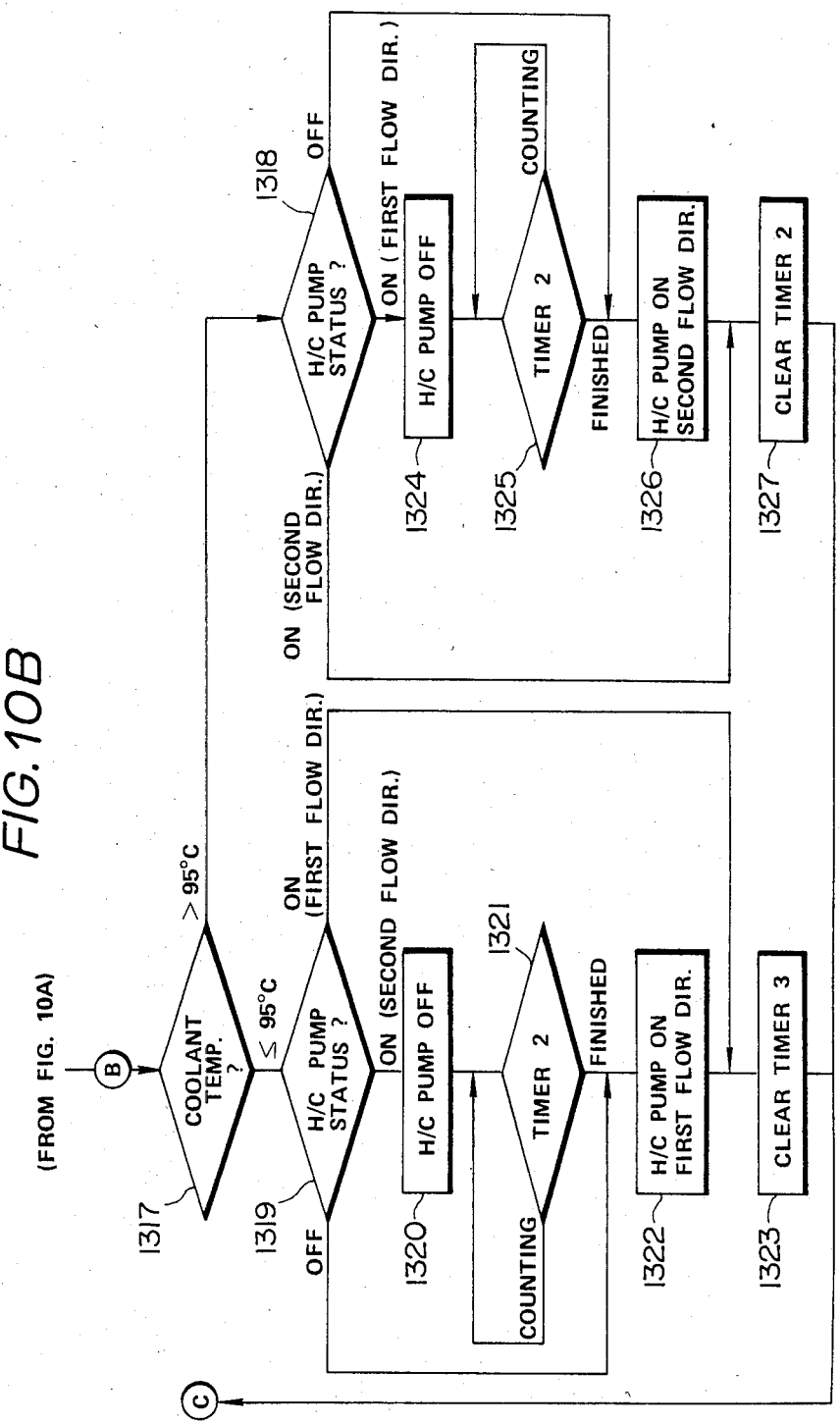

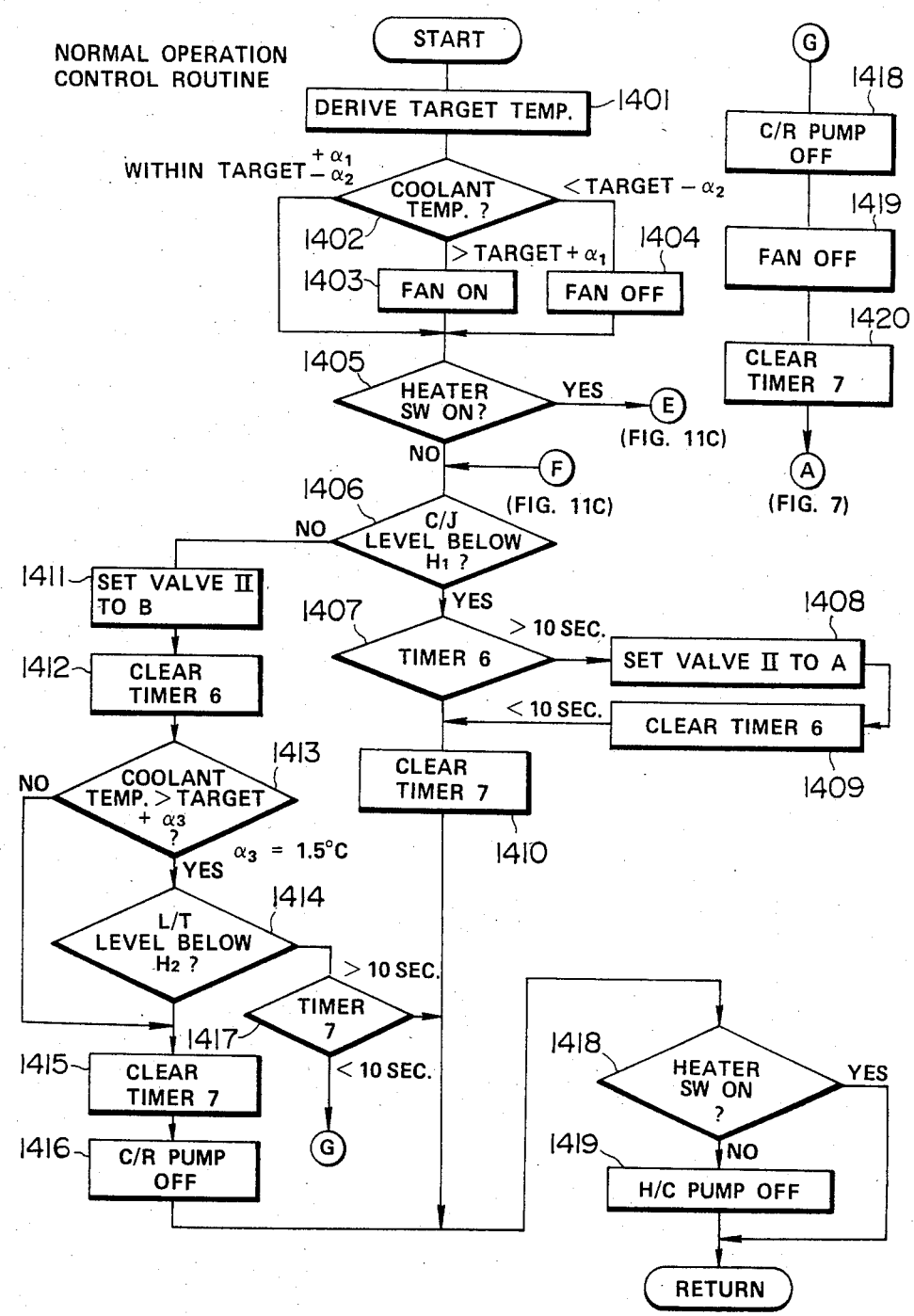

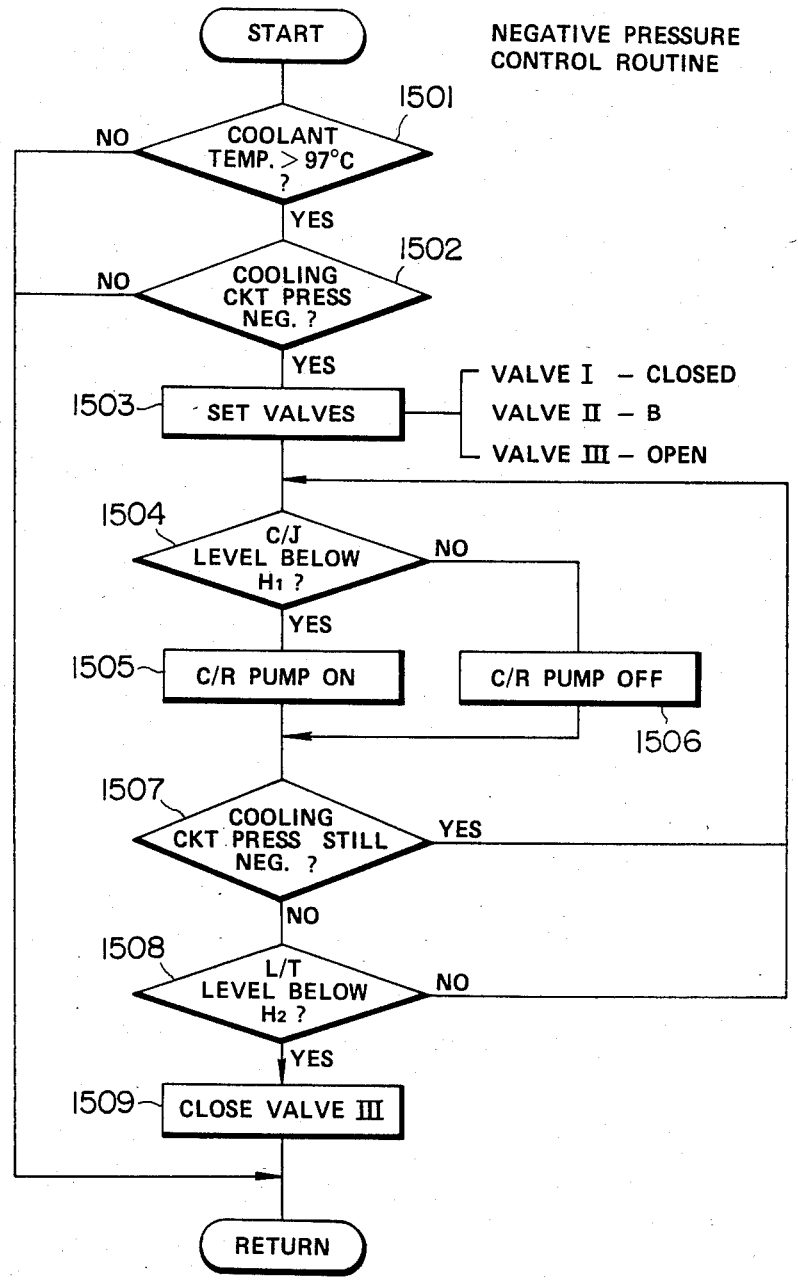

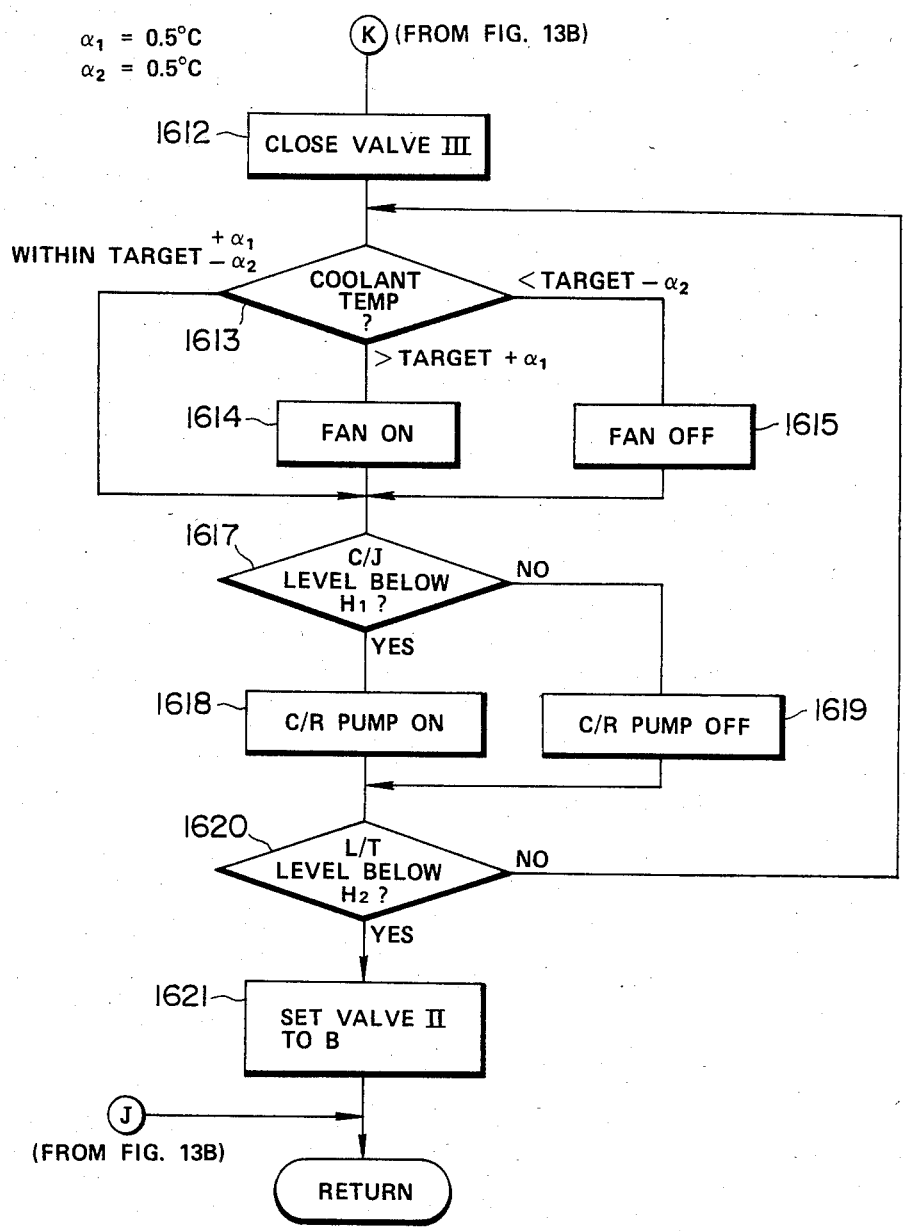

4,605,164

CABIN HEATING ARRANGEMENT FOR VEHICLE HAVING EVAPORATIVE COOLED ENGINE

BACKGROUND OF THE INVENTION

1. Field of the Invention

The present invention relates generally to an automotive cabin heating arrangement and more specifically to a heating arrangement which is incorporated with an evaporative type engine cooling system wherein the coolant is permitted to boil and the vapor used as a vehicle for removing heating from the engine, which minimizes the time after a cold engine start that cabin heating may be realized and which maximizes the amount of heat for the given heater which can be released into the cabin after the engine is fully warmed up.

2. Description of the Prior Art

FIG. 1 of the drawings shows a conventional cabin heating arrangement which is incorporated with a coolant circulation type engine cooling system. With this type of arrangement as the amount of coolant contained in the cooling system is inherently large, a relatively long period is required from the time the engine undergoes a "cold" start and the time which heated coolant is available for cabin heating purposes.

A further drawback encountered with this system is that the load on the coolant circulation pump is increased by the relatively long lengths of conduiting required to lead the heated coolant from the engine to the core of the cabin heater and back again to the coolant jacket of the engine. For example, given that the temperature difference between the inlet and discharge ports of the coolant jacket is 4° C., the amount of heat which 1 Kgm of water (coolant) can remove from the engine is 4 Kcal. Accordingly, in the case of an engine having a 1800 cc displacement (by way of example) the cooling system is required to remove approximately 4000 Kcal/h. In order to achieve this, a flow rate of 167 Liter/min must be produced by the coolant circulation pump. This of course consumes a number horse power. The addition of the cabin heating circuit circulation to the normal coolant circulation load only increases the amount of power which is consumed by the parasitic pump and which therefore cannot be supplied to driving wheels of the vehicle.

FIG. 2 shows an arrangement which is disclosed in U.S. Pat. No. 2,413,770 issued in Jan. 7, 1947 in the name of M. F. Knoy and which has sought to overcome the various drawbacks inherent in coolant circulation type cooling systems. In this arrangement the coolant is permitted to boil and the vapor used a vehicle for removing heating from the engine. This eliminates the need for a power consuming circulation pump. Moreover, the vapor can be supplied to a condenser (heater core) disposed in the passenger compartment of the vehicle in a manner to make use of the powerful heating effect possible by utilizing the latent heat of evaporation contained in the coolant vapor.

However, this type of arrangement has suffered from two major drawbacks. Firstly, the cabin heating system is not enabled until the engine has warmed sufficiently (after a cold start) to induce the coolant to boil and coolant vapor made available for cabin heating purposes and secondly, with the passing of time air tends to contaminate the system and badly impair the heat exchange efficiency of both of the engine radiator and the cabin heating arrangement. Viz., when the engine is stopped and the coolant vapor condenses, as the coolant jacket is only partially filled with liquid coolant a negative pressure tends to be produced which inevitably causes atmospheric air to leak in and contaminate the system. Upon restart of the engine the non-condensible matter (air) tends to be carried toward and into the radiator and cabin heater core by the coolant vapor. However, due to the tendancy for hot air to rise and the tendancy for condensed coolant to descend, a kind of embolism develops in the heat exchanging devices which drastically reduces the surface area available for heat exchange and thus badly impairs the efficiency of same.

FIG. 3 of the drawings shows a more recently proposed arrangement which is disclosed in U.S. Pat. No. 4,367,699 issued in Jan. 11, 1983 in the name of Evans. This arrangement while being a little more elaborate than the arangement shown in FIG. 2 tends to suffer from essentially the same demerits. That is to say, upon engine shut-down and the inevitable condensing of the coolant vapor, the resulting negative pressure which develops within the system is sufficient to suck air thereinto through a pressure relief valve arrangement A. It should be noted that this valve arrangement is such as to open to permit excess pressure to be vented from the system (for example upon a positive pressure of 0.2 to 1.0 Atmos. developing) and to permit the entry of air upon a negative pressure of approximately 0.34 Atmos. prevailing in the system.

A further drawback encountered with this system comes in the need for the gravity feed tank-like arrangement B which permits separation of liquid and gaseous coolant before the gaseous coolant is conducted to the condenser C and to the cabin heater core D. This arrangement render the system both bulky and difficult to dispose within the very limited space available within the engine compartment of modern automotive vehicles.

SUMMARY OF THE INVENTION

It is an object of the present invention to provide a cabin heating arrangement which is integrated with an evaporative type engine cooling system and which can begin warming the passenger compartment very shortly after the engine undergoes a cold start and which can subsequently release a relatively large amount of BTU for the size of the heater core after the engine has warmed-up.

In brief, the present invention achieves the above object by utilizing a cabin heating arrangement which is integrated with an evaporative type engine cooling system and wherein immediately after a cold engine start hot liquid coolant is inducted from a first port located immediately adjacent the most highly heated structure of the engine and pumped through the core of the cabin heater. Upon the coolant temperature rising sufficiently the flow direction is reversed and coolant vapor is inducted from a second port located above the first one and introduced into the heater core.

More specifically, the present invention resides in an automotive vehicle having a passenger compartment; an engine compartment; an engine disposed in the engine compartment which has a structure subject to high heat flux; a cooling system for removing heat from the engine; and a passenger compartment heating arrangement incorporated with the cooling system, the cooling system and the passenger heating arrangement being characterized by: a coolant jacket disposed about the engine into which coolant is introduced in liquid form and allowed to boil; a radiator fluidly communicated with the coolant jacket, the radiator being arranged to receive gaseous coolant produced by the boiling of the liquid coolant in the coolant jacket and condense same to its liquid form; means for returning liquid coolant from the radiator to the coolant jacket in a manner which maintains the level of coolant in the coolant jacket at a first predetermined level, the first predetermined level being selected to immerse the strcture in a predetermined depth of liquid coolant; a cabin heater disposed in the passenger compartment, the cabin heater including a core through which coolant may pass; a first port formed in the coolant jacket at a level higher than the first predetermined level; a second port formed in the coolant jacket at a level lower than the first predetermined level and proximate the structure; and a circulation pump in fluid communication with the core and the first and second ports, the pump being selectively operated to pump coolant from the first port to the second port via the core during a first mode of operation and pump coolant from the second port to the first port via the core during a second mode of operation.

BRIEF DESCRIPTION OF THE DRAWINGS

The features and advantages of the arrangement of the present invention will become more clearly appreciated from the following description taken in conjunction with the followiing drawings in which:

FIG. 4 shows an embodiment of the present invention;

FIGS. 7 to 14 are flow charts which depict the steps which characterize the control of the present invention.

DETAILED DESCRIPTION OF THE PREFERRED EMBODIMENTS

Before proceeding with the description of the embodiment of the present invention, it is deemed appropriate to discuss some of the concepts on which the cooling system with which the present invention is incorporated, is based.

Figure 1:
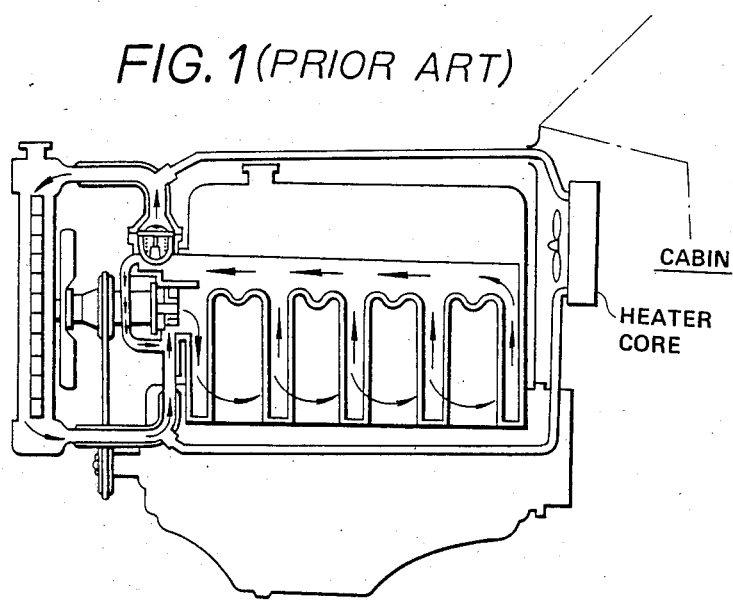
FIGS. 1 to 3 show the prior art arrangements discussed in the opening paragraphs of the instant disclosure.
Figure 2:
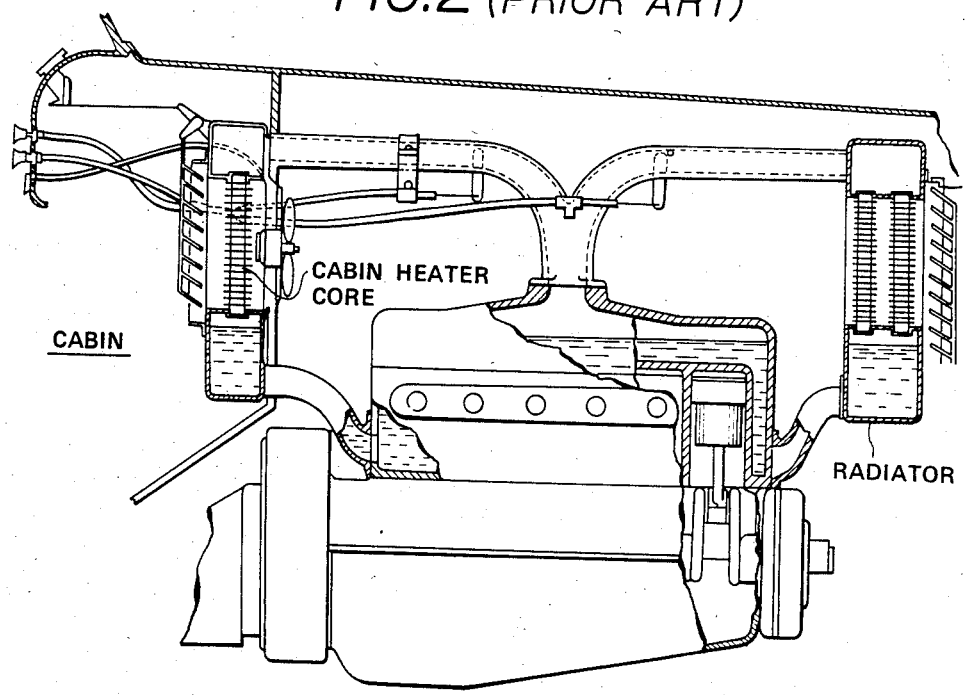
Figure 3:
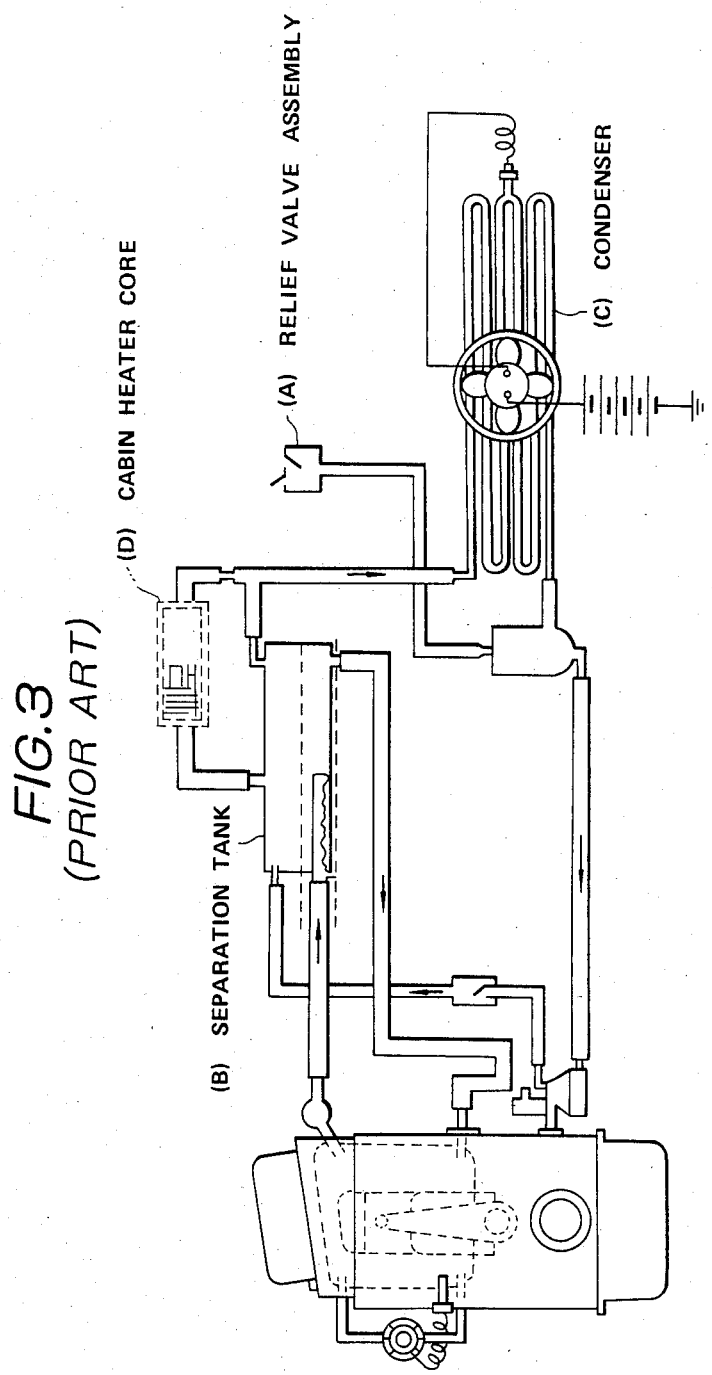
Figure 5:
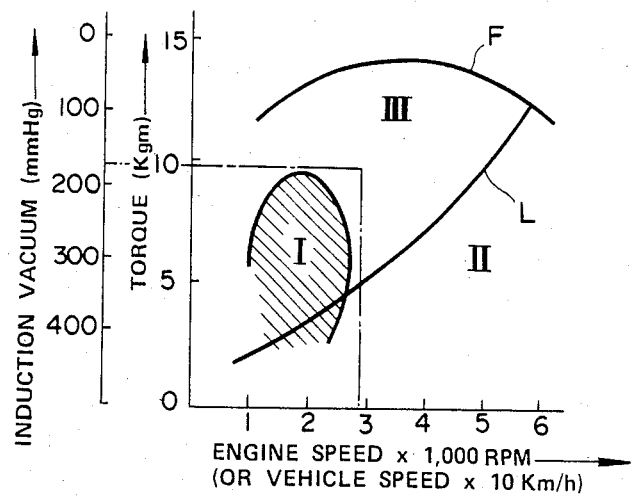
FIGS. 5 and 6 are graphs showing the load ranges encountered by auomotive vehicles and the change in boiling point which occurs which the change in pressure within the cooling system of the engine cooling system to which the present invention is applied.

FIG. 5 graphically shows in terms of engine torque and engine speed the various load "zones" which are encountered by an automotive vehicle engine. In this graph, the curve F denotes full throttle torque characteristics, trace L denotes the resistance encountered when a vehicle is running on a level surface, and zones I, II and III denote respectively "urban cruising", "high speed cruising" and "high load operation" (such as hillclimbing, towing etc.).

A suitable coolant temperature for zone I is approximately 110° C. while 90°–80° C. for zones II and III. The high temperature during "urban cruising" promotes improved thermal efficiency while simultaneously removing sufficient heat from the engine and associated structure to prevent engine knocking and/or engine damage in the other zones. For operational modes which fall between the aforementioned first, second and third zones, it is possible to maintain the engine coolant temperature at approximately 100° C.

Figure 6:
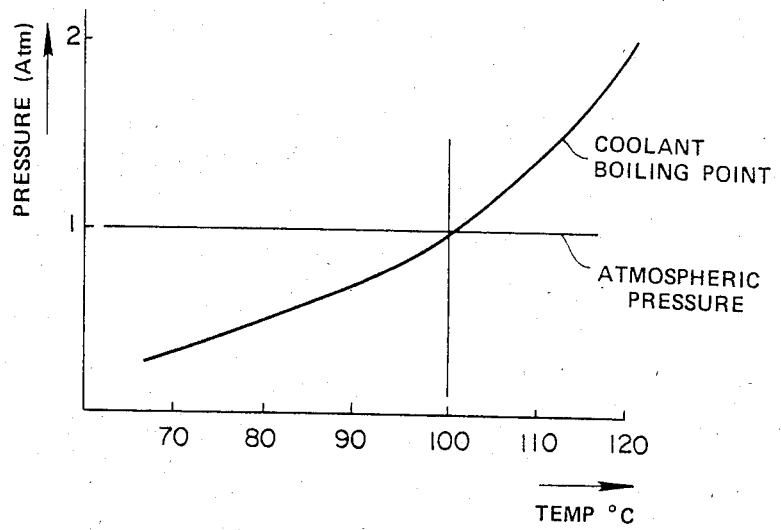

With the cooling system to which the present invention is applied, in order to control the temperature of the engine, advantage is taken of the fact that with a cooling system wherein the coolant is boiled and the vapor used a heat transfer medium, the amount of coolant actually circulated between the coolant jacket and the radiator is very small, the amount of heat removed from the engine per unit volume of coolant is very high, and upon boiling, the pressure prevailing within the coolant jacket and consequently the boiling point of the coolant rises if the system employed is closed. Thus, by circulating only a limited amount of cooling air over the radiator, it is possible reduce the rate of condensation therein and cause the pressure within the cooling system to rise above atmospheric and thus induce the situation, as shown in FIG. 6, wherein the engine coolant boils at temperatures above 100° C. for example at approximately 119° C. (corresponding to a pressure of approximately 1.9 Atmospheres).

On the other hand, during high speed cruising, it is further possible by increasing the flow cooling air passing over the radiator, to increase the rate of condensation within the radiator to a level which reduces the pressure prevailing in the cooling system below atmospheric and thus induce the situation wherein the coolant boils at temperatures in the order of 80° to 90° C. However, under such conditions the tendency for air to find its way into the interior of the cooling circuit becomes excessively high and it is desirable under these circumstances to limit the degree to which a negative pressure is permitted to develop.

Figure 4:
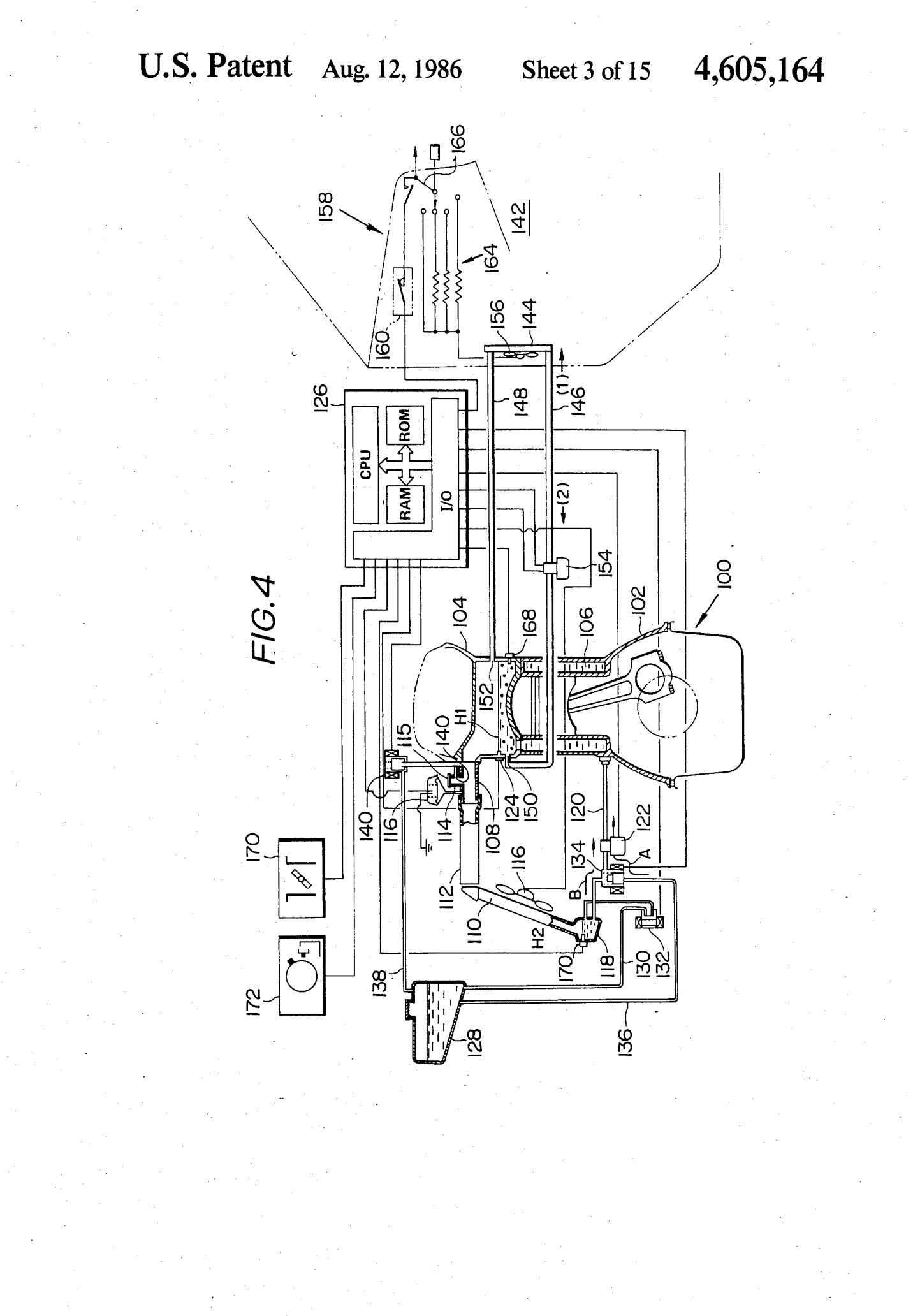

FIG. 4 shows a first embodiment of the present invention. In this arrangement an engine 100 is includes a cylinder block 102 on which a cylinder head 104 is detachably secured. The cylinder block and cylinder head are formed with suitable cavities in a manner to define a coolant jacket 106 about structure of the engine such as the combustion chambers exhaust ports and valves which are subject to a high heat flux. A vapor manifold 108 secured to the cylinder head 104 communicates with a condenser or radiator 110 as it will be referred to hereinafter, via a vapor transfer conduit 112. The vapor manifold 108 is formed with a riser 114 which is hermetically sealed by a cap 115. Communicating with the vapor manifold 108 at a location adjacent the riser 114 is a pressure responsive switch arrangement 116. In this embodiment the switch is arranged to be triggered in response to a predetermined (negative) pressure differential developing between the interior of the coolant jacket 106 and the ambient atmosphere.

Located adjacent the radiator 110 is an electrically driven fan 116 which is arranged to selectively increase the flow of ambient air over the surface of the tubing and the like which constitutes the heat exchanging surface area of the radiator 110. Disposed at the bottom of the radiator 110 is a small collection vessel or lower tank 118 as it will be referred to hereinafter.

A coolant return conduit 120 leads from the lower tank 118 to the coolant jacket 106 of the engine 100. A small capacity coolant return pump 122 is disposed in this conduit and arranged to selectively energizable in a manner which inducts coolant from the lower tank 118 and forces same toward and into the coolant jacket 106.

In order to maintain the level of coolant at a first predetermined level H1 a first level sensor 124 is disposed in the coolant jacket as shown. As will be appreciated the level H1 is selected to be a predetermined height above the upper level the structure of the engine subject to the highest heat flux (viz., the combustion chambers, exhaust ports and valves). The output of sensor 124 is fed to a control circuit 126 which in this embodiment includes a microprocessor comprised of a CPU, RAM, ROM and an in-out interface I/O. The control circuit 126 in turn issues an energizing signal to the coolant return pump 122 each time that level sensor 124 indicates that the level of coolant in the coolant jacket 106 has decreased below level H1 and it is necessary to replenish same in order to maintain the highly heated structure of the engine immersed in sufficient liquid coolant and thus avoid localized dry-outs and hot spot formation which tend to occur upon the occurrance of vigorous bumping and frothing of the boiling coolant. It is within the scope of the present invention to arrange for the level sensor to exhibit hysteresis characteristics so as to obviate rapid ON/OFF cycling of pump 122.

Located adjacent the engine 100 is a coolant reservoir 128. This reservoir is arranged to communicate with the cooling circuit of the engine—viz., the coolant jacket 106, vapor manifold 108, vapor transfer conduit 112, radiator 110, coolant return conduit 120 and pump 122—via a valve and conduit arrangement which includes: a coolant fill/discharge conduit 130 which leads from the reservoir 128 to the lower tank 118; an ON/OFF type electromagnetic valve 132 which is disposed in this conduit and arranged to permit fluid communication between the reservoir 128 and lower tank 118 when de-energized; a three-way valve 134 which is disposed in the coolant return conduit 120 at location between the coolant return pump 122 and the lower tank 118 and which is arranged to selectively provide fluid communication between the reservoir 128 via a coolant induction conduit 136 (viz., flow path A) when in a first state (in this case de-energized) and establish "normal" communication between the lower and the pump (flow path B) when in a second state (energized); and overlow/vent conduit 138 which leads from a "purge" port 140 formed in the riser 114 immediately below the cap 115; and a normally closed ON/OFF type valve 140 disposed in the overflow/vent conduit and which permits fluid communication between the cooling circuit and the reservoir 128 when energized to assume an open state.

Disposed in a cabin 142 of the vehicle is a heater arrangement including a core 144 through which heated coolant may be circulated. As shown, core 144 communicates with the coolant jacket 106 via conduits 146, 148. The first conduit 146 is arranged to communicate with a port 150 formed in the cylinder head 104 immediately adjacent the highly heated structure of the engine and at level lower than H1. The second conduit 148 is arranged to communicate with a port 152 formed in the cylinder head 104 at a level above H1. A coolant circulation pump 154 is disposed in the first conduit 146 and arranged to energizable in first and second modes. The first of these mode is such as to induct coolant from port 150 and pump same via core 144 to port 150 (viz., induce coolant to flow in a first flow direction (I)) while the second is such as to induct coolant from port 152 and pump same toward port 150 (viz., pump coolant in a second flow direction (II)).

The cabin heating arrangement further includes a fan 156 and a fan control switch arrangement 158. The latter mentioned fan control switch arrangement 158 includes an ON/OFF switch 160 and a fan speed control arrangement 162 including a plurality of resistors 164 and a selector switch 166. The ON/OFF switch 160 is circuited with the control circuit 126 in manner that when closed to energize the fan 156, the control circuit 126 receives an input indicative of the requirement for cabin heating. Of course this heating arrangement can be incorporated into an air conditioning unit if so desired, however for the sake of brevity discussion will be limited to a simple heating arrangement.

In order to control both the heater circulation pump 154 and the operation of the fan 116 and valve and conduit arrangement, a temperature sensor 168 is disposed in the coolant jacket 106. In this embodiment sensor 168 is arranged in the cylinder head 104 in a manner to be immersed in the liquid coolant. Of course it is possible to use a pressure sensor in lieu of the temperature sensor 168 is so desired. The output of the temperature sensor 168 is fed to the control circuit 126.

In order to facilitate the control of the cooling system during the various modes of operation thereof, a second level sensor 70 is disposed in the lower tank 118 and arranged to sense the level of coolant having reached a second level H2 which is selected to lower than the tubing of the radiator 110 via which the latent heat of evaporation of the coolant is released to the surrounding ambient atmosphere and essentially at the same level as fill/discharge conduit 130. This particular arrangement is deemed advantageous in the event that a "hot non-condensible purge" should be necessary to flush out any stubborn pockets of air which may be trapped in the radiator 110 and reducing the heat exchange efficiency thereof to the point of inducing system overheat. Viz., should the temperature rise to a level which cannot be controlled via energizations of fan 116 it is possible to momentarily open valve 132 an permit the pressurized vapor in the radiator 110 to vent out through conduit 130 to the reservoir 128. As will be appreciated, in order to minimize the amount of coolant which is displaced during this mode of operation and to maximize the tendancy for any air or the like non-condensible matter in the radiator to be flushed out with the vented vapor, it is advantageous to arrange of the lower end of conduit at level H2 whereat the level of liquid coolant in the lower tank 118 is most frequently maintained. This mode of operation along with the other major control modes will become more clearly appreciated hereinlater when the control steps illustrated in the flow charts of FIGS. 7 to 14 are discussed.

In order to sense the load and/or other engine operational parameters a load sensor 170 and an engine speed sensor 172 are arranged to submit data signals to control circuit 126. The load sensor 170 may take the form of a throttle valve position switch, air flow meter an induction vacuum switch on the like. Alternatively, the pulse width of a fuel injection control signal may be used. The engine ignition system may be tapped to provide the engine speed signal in the event that a crank angle sensor is not available.

Prior to initial use it is necessary to completely fill the cooling circuit and the conduiting 146, 148 and heater core 144 which form vital part of the heating system with liquid coolant in a manner to completely displace any non-condensible matter. This operation may be accomplished by removing cap 115 and manually filling the system. At this time it is deemed advantageous to energize coolant circulation pump 154 in a manner which pumps coolant from port 150 to port 152 and thus flush out any air that might be trapped in the core 144 and conduting 146, 148. To facilitate this operation it is possible to add a manually operable switch (not shown) which selectively energizes the pump. It is further possible to introduce coolant into the reservoir 128 and manually induce the energization of the valves 132, 134 and pump 122 and thus pump excess coolant into the system until a visible overflow occurs at the riser 114. This type of arrangement also facilitates regular servicing of the system.

The various modes of operation which are induced from the time the engine is started to the time it is stopped or shut-down as it will be referred to, will become more clearly appreciated from the following discussion of the flow charts of FIGS. 7 to 14.

FIG. 7 shows in flow chart form the steps which characterize the overall control of the engine cooling and cabin heating arrangements. As shown, upon start-up of the engine the system is initialized at step 1001. Following this the output of the temperature sensor 168 is sampled and the instant temperature of the engine determined (step 1002). If the temperature of the coolant is less than a predetermined temperature—in this case 45° C. then a non-condensible matter purge control routine (step 1003) executed while in the event that engine coolant is above the predetermined limit, the purge control routine is by-passed and a displacement/warm-up control routine run at step 1004.

During the latter mentioned control routine the excess coolant which completely fills the coolant circuit of the engine is displaced out to the reservoir 128 either until (a) the temperature of the engine coolant reaches a temperature most suited for the instant set of operating conditions or (b) a predetermined minimum amount of coolant remains in the cooling circuit.

At step 1005 a normal operation control routine is entered. This routine controls the operation of the various elements of the cooling system in a manner to vary the temperature according to engine load and/or other parameters and to ensure that the level of coolant in the coolant jacket is maintained at a level sufficient to adequately immerse the highly heated engine structure in a predetermined depth of liquid coolant.

In the event that the pressure within the cooling circuit falls due to external influences such as ambient temperature, humidity and the like, a negative pressure control routine (step 1006) is executed, while in the event that inclusion of pockets of contaiminating non-condensible matter or the like induces the coolant temperature to rise above the control possible with the normal operation routine an abnormally high pressure control routine is run.

In the event that at any point following the initialization of the system the engine stops or is stopped, an interrupt (step 1101—FIG. 8) is carried out to break into the current control routine and enable the execution of a shut-down control routine (step 1102).

Each of the above mentioned routines will now be discussed with reference to FIGS. 9 to 14.

Non-Condensible Matter Purge Control Routine

Subsequent to the decision that the coolant temperature is below a temperature at which a so called "warm start" can be performed (viz., the engine has not cooled sufficiently after use that any particular quantity of air or the like is likely to have entered the cooling circuit) a non-condensible matter purge is carried out to ensure that any air or the like is removed before the system is put in full use. At step 1201 of this routine, valves 140, 134 and 132 are conditioned as shown. For ease of explanation, a convention wherein the valves are referred to accordingly to their physical height on the illustrated system will be used. Viz., valve 140 being the highest will be referred to valve I; three-way valve 134 being located at a level between valves 140 and 132 will be referred to as valve II; and valve 132 as valve III.

At step 1202 the coolant return pump 122 (C/R pump) is energized. Under these conditions as valve II (134) is conditioned to establish flow path A the pump 122 inducts coolant from the reservoir 128 via the induction conduit 136 and introduces same into the coolant jacket via coolant return conduit 120. As valve I (140) is open at this time any excess coolant which may tend to accumulate in the cooling circuit is able to overflow back to the reservoir 128 through conduit 138. To ensure that pump 122 is operated sufficiently to completely clear the cooling circuit of air bubbles and the like the purge routine includes steps 1203 to 1205. At step 1203 it is determined if the level of coolant in the coolant jacket 106 (C/J) is above level H1 via sampling the output of level sensor 124. If for any particular reason the level of coolant is below level H1 then the routine recycles until such time as the level rises up to H1. On the other hand, if the level is above H1 then the program flow to step 1204 whereat the heater circulation pump 154 (H/C pump) is energized. In the instant embodiment the heater circulation pump 154 is simultaneously energized to induct coolant from port 150 and pump same toward port 152 (i.e. in the first flow direction) so as flush any bubbles of air or the like upwardly out of the heater core.

At step 1205 a "soft" clock or the like is set counting. In this embodiment the clock (Timer 1) is arranged to count for a predetermined period which can vary from several tens of seconds to one or even several minutes. Upon completion of the count both of the pumps 122 and 154 are stopped (step 1206) and at step 1207 the soft clock (Timer 1) cleared ready for the next run.

Coolant Displacement/Warm/up Control Routine

Figure 10A:
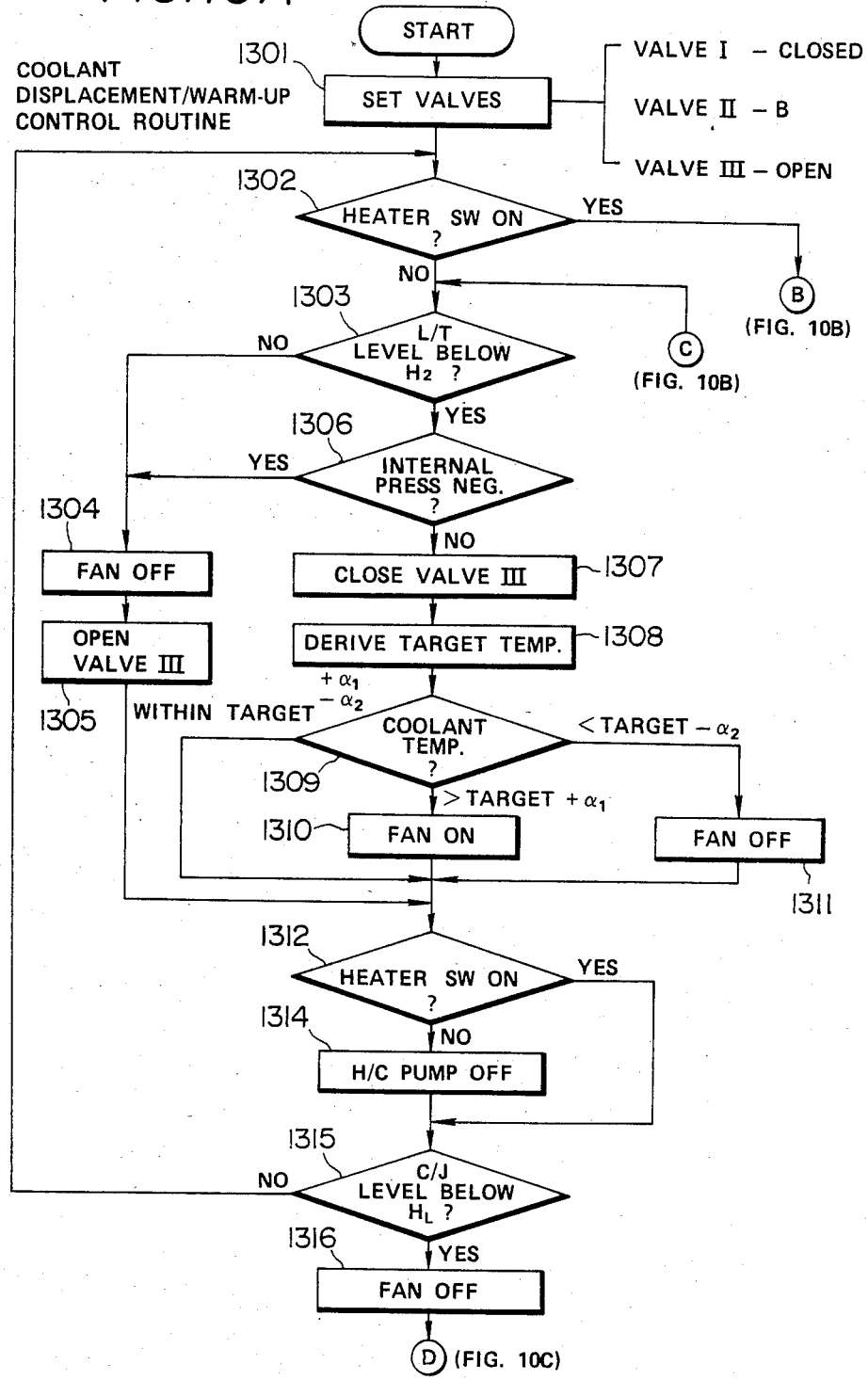
Figure 10C:
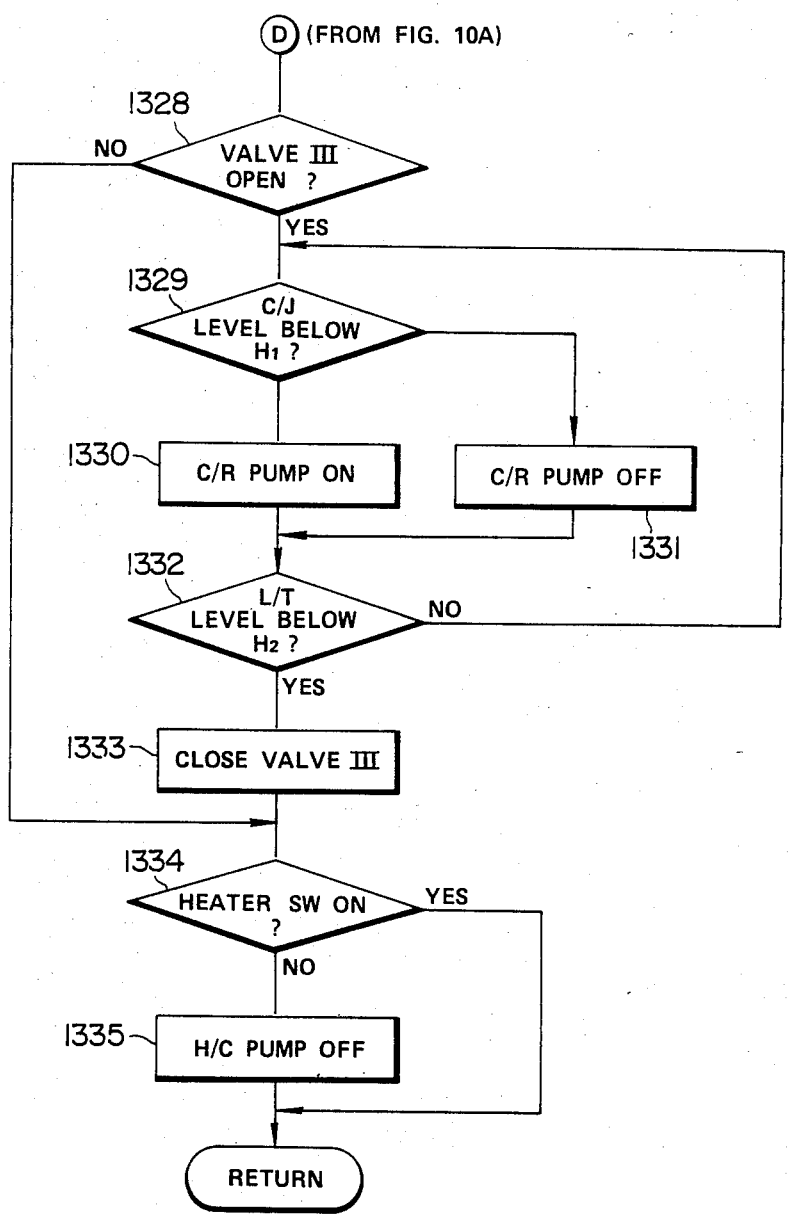

FIGS. 10A to 10C show the steps which characterize the warm-up and displacement of the coolant contained in cooling circuit. As mentioned previously, this routine can be executed either after a non-condensible matter purge or in the event that the coolant temperature is above the predetermined temperature utilized at step 1002.

At step 1301 valves I, II and III are conditioned as shown. That is to say, valve I is closed, three-way valve is conditioned to establish flow path B and the lowermost valve 132 opened. At step 1302 it is determined if the heater ON/OFF switch 160 is on or not. In the event that the switch 160 is ON indicating the requirment for cabin heating, the program flows to (B) which is shown in FIG. 10B. However, if the switch is OFF, then the program goes to step 1303 whereat it is determined if the level of coolant in the lower tank 118 is above or below level H2. This of course can be determined by sampling the output of level sensor 170. In the event that the level of coolant is above H2 then at step 1304 the operation of the fan 116 is prevented and at step 1305 a command to open valve III issued.

If the outcome of the enquiry carried out at step 1303 indicates that the level of coolant in the lower tank 118 is at or below level H2 then at step 1306 the output of the pressure differential switch arrangement 116 is sampled to determined if the pressure prevailing within the cooling circuit is negative nor not. If the pressure has lowered to the point of being below atmospheric by a predetermined amount then the program flows to step 1304. However, if the pressure is above the lower permissible limit then at step 1307 a command to close valve III (132) is issued to prevent too much coolant be displaced from the system and inducing a shortage of same.

At step 1308 the most appropriate temperature for the coolant to be maintained at in view of the instant set of operating conditions is derived. This "target" temperature as it will be referred to, may be derived using the inputs from sensors 170 and 172 and performing a table look-up (using a table based on the load zone chart shown in FIG. 5) or simply calculated using a predetermined calculation program. The various ways in which the just mentioned "target" value can be derived will be obvious to those skilled in the art of programming and as such will not be discussed for the sake of brevity.

At steps 1309, 1310 and 1311 the temperature of the coolant is ranged and in the event that the instant coolant temperature is above the target by a value of $\alpha 1$ (wherein $\alpha 1 = 0.5°$ C.) then fan 116 is energized while if below target by the same amount then the operation of the fan is stopped.

At step 1312 the condition of heater switch 160 is again sampled and if indicated as being OFF then at step 1314 the operation of the coolant circulation pump 154 is stopped.

At step 1315 the output of coolant level sensor 124 is sampled and in the event that the level of coolant in the coolant jacket 106 is still above H1 then the program flows back to step 1302 to allow for more of the excess coolant to be displaced out of the cooling circuit to the reservoir 128. However, if the coolant level is at H1 then the operation of the fan 116 is stopped and the program flows to step 1328 (see FIG. 10C).

FIG. 10B shows the steps which are implemented in the event that the requirement for cabin heating is indicated at step 1302 of FIG. 10A. As shown, if the coolant temperature is greater than 95° C. then the program flows to step 1318 while if equal to or lower than 95° C. then the program flows to an essentially similar step 1319. In these steps the status of the heater circulation pump 154 is determined. Viz., is (a) the pump OFF, (b) operating to pump in the first flow direction or (c) pumping in the second flow direction. As will be appreciated the program flow following step 1319 (steps 1320 to 1323) is such as to ensure that when the temperature of the coolant is below the above mentioned limit (95° C.) the coolant circulation pump 154 is conditioned to pump in the first flow direction while the steps 1324 to 1327 following step 1318 are such as to ensure that upon the predetermined temperature being reached pump 154 is conditioned to pump in the second flow direction. The brief intervals induced by the timer steps 1321 and 1325 smooth out the transition between flow directions.

FIG. 10C shows the steps which follow from on step 1316 shown in FIG. 10A. As shown, at step 1328 it is determined if the valve III is open or not. In the event that the this valve is not open then the program by-passes steps 1329 to 1333 and goes directly to step 1334. However, in the event that valve III is still open then it is necessary to ensure that the level of coolant in the coolant jacket remains at the desired level H1 and thus the steps 1329, 1330 and 1331 are executed. At step 1332 the level of coolant in the lower tank 118 is determined by sampling the output of level sensor 170. If the level of coolant is still above H2 then it is assumed that it is still possible to discharge further coolant and accordingly the program recycles to step 1329. However, if the level in the lower tank 118 is at H2 then the possibility of over-discharging coolant is deemed possible and accordingly at step 1333 valve III (132) is closed.

At step 1334 the condition of switch 160 is again sampled and in the event that it is OFF, then at step 1335 the heater circulation pump 154 is stopped. In the event that switch 160 is ON this step is by-passed and the displacement/warm-up routine terminates leaving the system in condition for entry into control under the "normal operation condition routine".

Normal Operation Control Routine

The first step (1401) of this routine involves determining the target temperature at which the coolant in the coolant jacket 106 should be controlled to. This derivation is conducted in a manner similar to that described in connection with step 1308 (see FIG. 10A). At steps 1402, 1403 and 1404, the instant coolant temperature is ranged against the value derived in step 1401. In the event that the temperature is above target by 0.5° C. then the operation of the cooling fan 116 is induced while if below target by the same degree then the operation of the fan is stopped.

Figure 11C:
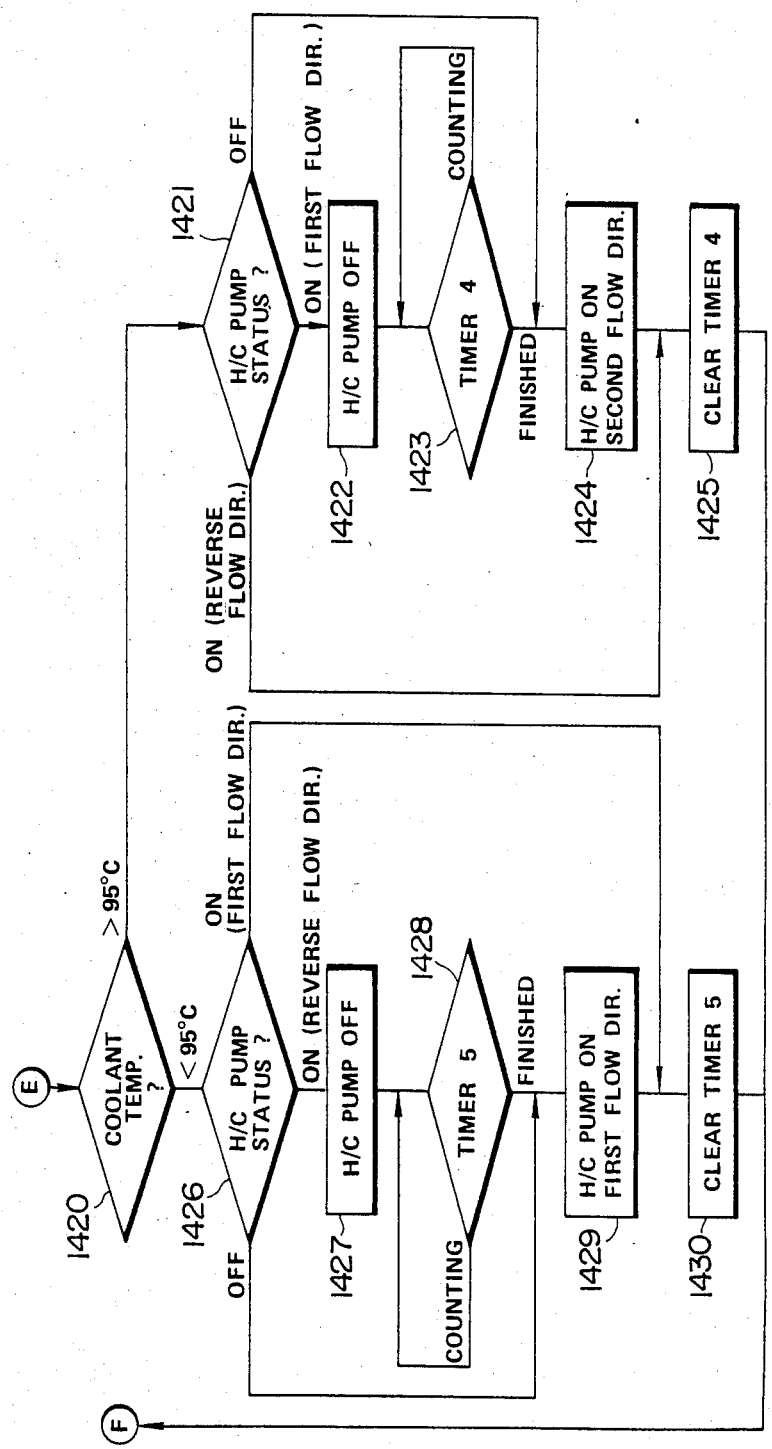

At step 1405 the condition of switch 160 is sampled and in the event that the heater is required then the program flows to (E) (see FIG. 11C). On the other hand, if the heater is not required then the level of coolant in the coolant jacket 106 is determined (step 1406) and in the event that the level is below H1 then valve II is conditioned to produce flow path A for a predetermined period of time (in this case ten seconds—see steps 1407 to 1410). However, in the event that the level of coolant in coolant jacket 103 is above level H1 then the program goes to step 1411 wherein valve II is conditioned to produce flow path B. At step 1412 the timer which holds valve II conditioned to produce flow path A (viz., timer 6—step 1407) is cleared and at step 1413 the instant coolant temperature compared with a value equal to target $+ \alpha 3$ (where $\alpha 3 = 1.5°$ C.). If this enquiry reveals that the instant coolant temperature does not exceed the just mentioned value then step 1414 is by-passed, timer 7 cleared (step 1415) and coolant return pump 122 stopped (step 1416). However, if the comparison reveals that the instant coolant temperature is above said value, then at step 1417 timer 7 is set counting for a period time (in this case ten seconds). Until timer 7 finishes counting the program is caused to flow to steps 1418 to 1420 and thereafter back to step 1004 (FIG. 7) to re-enter the displacement/warm-up routine. Upon completion of the count (10 seconds) timer 7 permits the program flow to steps 1418 and 1419 wherein the demand for cabin heating is determined and if not required the coolant circulation pump 154 is stopped. The program then returns.

FIG. 11C shows the steps which follow on from step 1405 (FIG. 11A) in the event that the enquiry carried out therein indicates that the heater switch 160 is ON and there exists a requirement for the heater to have heated coolant circulated therethrough. At step 1420 the instant coolant temperature is determined by sampling the output of temperature sensor 168. In the event that the coolant temperature is above 95° C. then the program flows to step 1421 wherein the status of the coolant circulation pump 154 is determined. Steps 1422 to 1425 following step 1421 ensure that as the temperature of the coolant is sufficiently elevated that the coolant circulation pump 154 is operated to pump coolant in the second flow direction (i.e., from port 152 to 150). That is to say, at this temperature, port 152 will be exposed to coolant vapor rather than liquid coolant and in order to maximize the amount of heat which can be released from the heater core 144 it is advantageous to permit coolant vapor to enter the heater core wherein it can release its latent heat of evaporation. The resulting condensate is returned to the coolant jacket via port 150.

With the present invention it is deemed advantageous to locate port 150 at a site which is displaced in the longitudinal direction of the engine with respect to the location of port 152. This arrangement is particularly advantageous when the pump is operating in the first flow direction (at which time the coolant jacket is usually filled above level H2 with liquid coolant and liquid coolant is being forced through the heater core) so as to avoid a localized cooling effect within the jacket at time when it is important to permit the engine to warm as quickly and as uniformly as possible while still permitting the heating the cabin to be initiated as soon as possible after engine start-up. Viz., if the coolant is tapped off and return from the heater core to essentially the same zone, a localized pocket of relatively cool coolant tends to develop which tends to inhibit the effectiveness of the heater under such conditions. Thus, by staggering the locations of the ports 150 and 152 in the longitudinal direction of the engine (i.e. the coolant jacket) hot coolant can always be expected to pass through the heater core during the initial stages of engine warm-up.

Accordingly, when the coolant temperature is below 95° C. the control program shown in FIG. 11C flows to steps 1426 to 1430 which ensure that coolant is inducted from port 150 and pumped toward port 152 in a manner to induct hot liquid coolant from a site located in close proximity to a portion of the most highly heated structure of the engine.

From steps 1425 and 1430 the program flows back to step 1406 (FIG. 11A) whereat the level of coolant in the coolant jacket is checked.

In summary, the steps shown in FIG. 11C are such as to ensure that the quickest and most effective cabin heating possible is effected in view of the instant status of the cooling system given that a demand for cabin heating or use of the heater is generated by tapping off hot liquid coolant during initial warm-up and then switching to coolant vapor when the latter is available.

Negative Pressure Control Routine

FIG. 12 shows the steps which characterize the control which is effected with the present invention in the event that due to external influences in particular, the rate of condensation in radiator 110 exceeds that which can be controlled only by stopping the operation of the fan 116.

As shown, subsequent to the start of this routine the instant coolant temperature is determined by sampling the output of temperature sensor 168 (step 1501). In the event that the temperature is greater 97° C. then the routine is by-passed and the program proceeds on to the next control. However, if the outcome of step 1501 is such as to indicate that the coolant is boiling at a temperature lower than 97° C. the program flows to step 1502 whereat the pressure prevailing in the cooling circuit with respect to the instant atmospheric pressure is determined by sampling the output of the PD responsive switch arrangement 116. In the event that the pressure within the system is super-atmospheric then the remaining steps of the routine are by-passed as shown. However, if the pressure within the cooling circuit is in fact sub-atmospheric then at step 1503 valves I, II and III are conditioned at a shown. In this state the system is conditioned to permit coolant to be inducted from the reservoir 128 into the radiator 110 via fill/discharge conduit 130 and lower tank 118 in a manner to simultaneously raise the pressure toward atmospheric and reduce the surface area of the radiator 110 via which the latent heat of evaporation of the gaseous coolant can be released to the ambient atmosphere.

At steps 1504, 1505 and 1506 the level of coolant in the coolant jacket is controlled to level H1 in a manner described hereinbefore. At steps 1507 and pressure prevailing in the cooling circuit is determined and in the event that a negative pressure still exists therein the program recycles to step 1504. However, in the event that the pressure in the system has risen to atmospheric then at step 1508 the level of coolant in the lower tank 118 is determined and if the level therein is above H2 then the program recycles to step 1504 to provide further time for the excess coolant introduced into the radiator 110 to be re-displaced. Upon the pressure and temperature in the system rising back up to acceptable levels valve III is closed in step 1509 to seal the system and place same in a closed circuit condition.

In summary, upon an "overcool" condition of the cooling system occuring, the system is placed in an "open" circuit condition to permit additional coolant to be inducted into the system from reservoir 128 under the influence of the negative pressure. This measure increases the pressure in the system and reduces the heat exchange efficiency of the radiator 110. This open circuit state is maintained until such time as the engine is stopped or the overcooled condition ceases to exist.

Abnormally High Pressure Control Routine

Figure 13A:
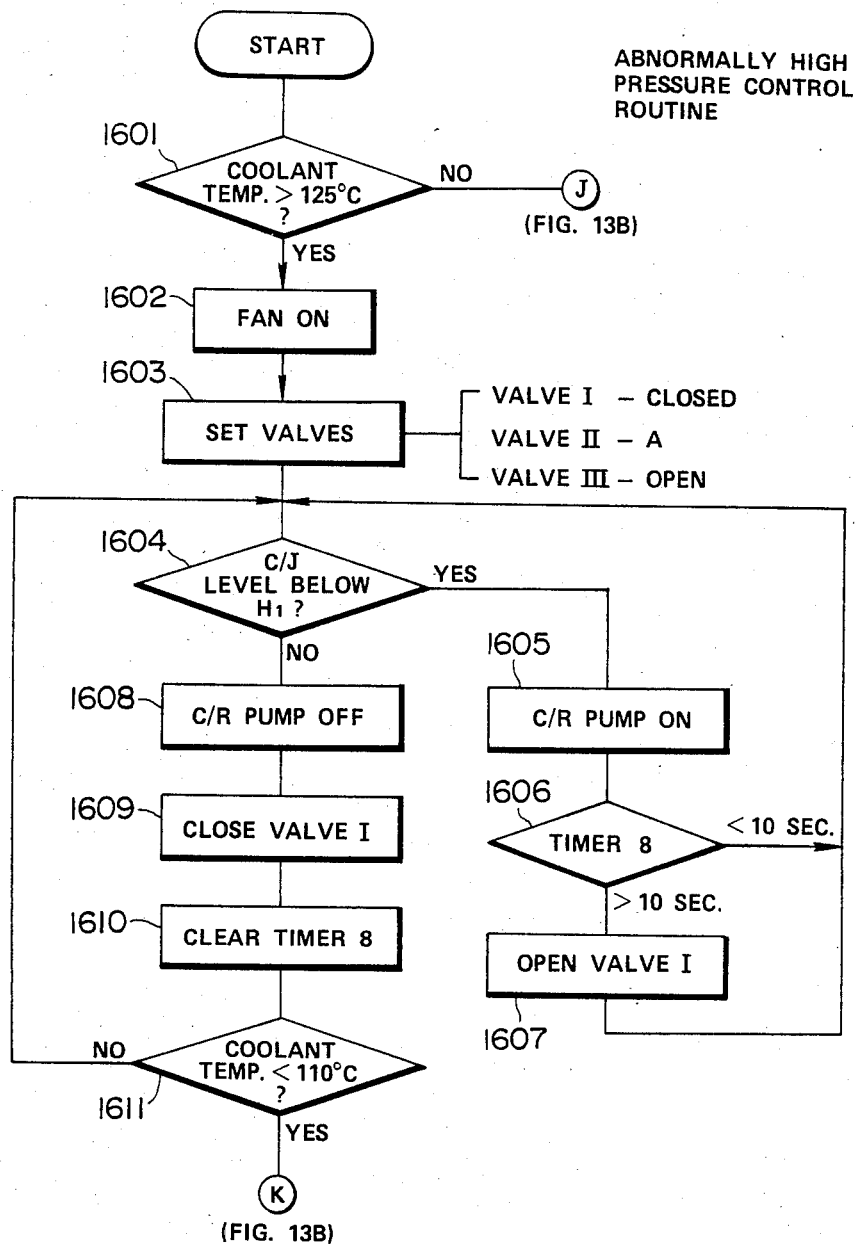
Figure 14:
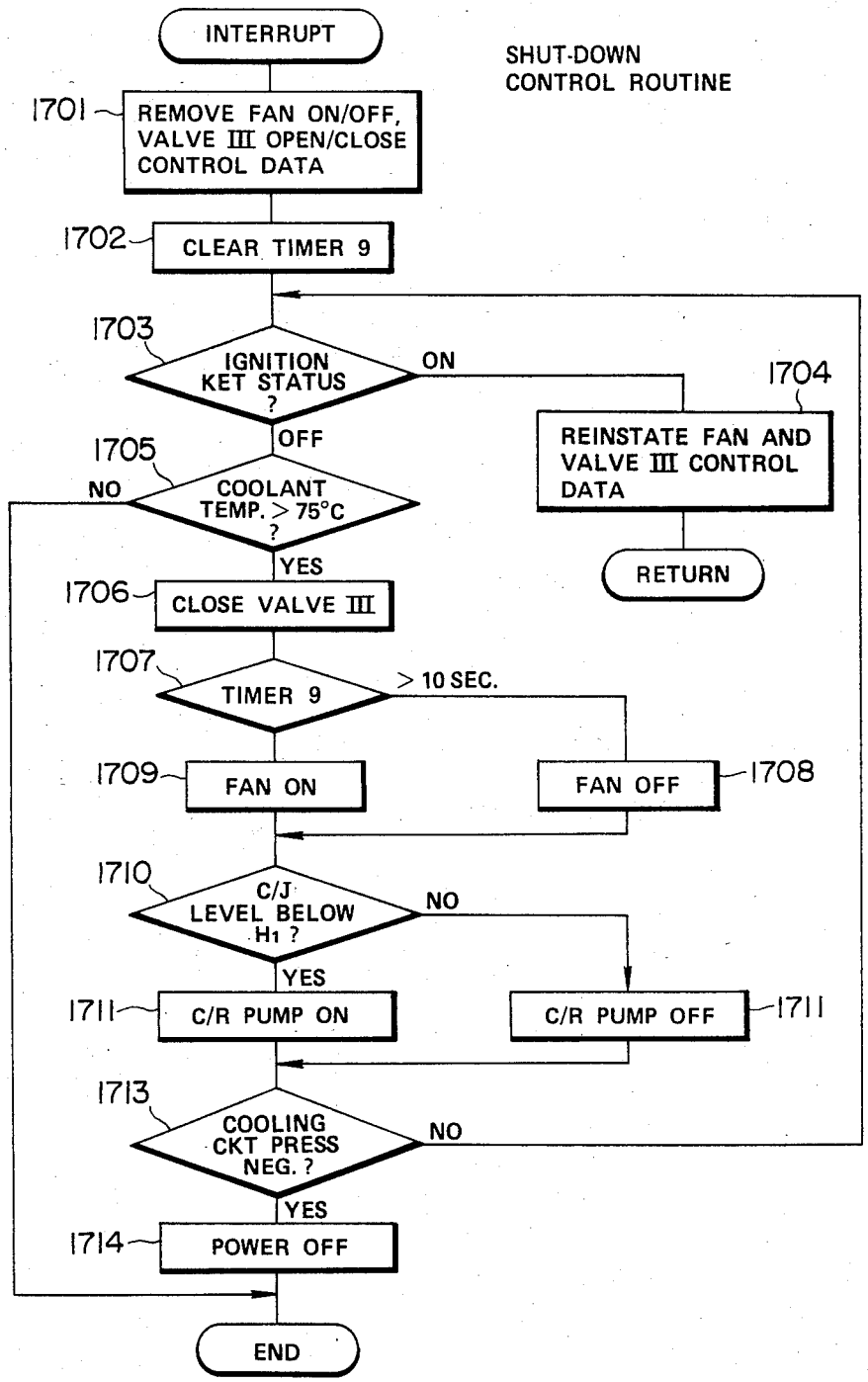

FIG. 13A shows the first half of the this routine. At step 1601 the instant temperature of the coolant is sampled and in the event that the temperature is above 125° C. then the program flows into the routine while in the event that an abnormally high pressure is not indicated by the temperature sample, the program returns.

In the event that the temperature sampling indicates that the pressure in the system is abnormally high, then at step 1602 the operation of fan 116 is induced and at step valve I-III are conditioned as shown. Under these conditions the valve and conduit arrangement associated with the cooling system is arranged to permit coolant to be discharged from the radiator 110 via fill/discharge conduit 130 while fresh coolant can be pumped into the coolant jacket 106 via induction conduit 136 in a manner to maintain the coolant level at H1.

At step 1604 the level of coolant in the coolant jacket is determined by sampling the output of level sensor 124. In the event that the level is lower than H1 then coolant return pump 122 is energized. If the level of coolant in the coolant jacket 106 is not increased to level H1 within a predetermined period (in this instance 10 seconds) at step 1607 valve I is opened so as to vent the excessively high pressure to atmosphere via overflow conduit 138 and the program flows back to step 1604. Pending the level of coolant being raised to level H1 the operation of coolant return pump 122 is stopped at step 1608. At step 1609 an instruction to close valve I is issued and at step 1610 timer 8 (used in step 1606) is cleared. Subsequently, at step 1611 the coolant temperature is again sampled and in the event the pressure is still above 110° C. then the program flows back to step 1604. On the otherhand, if the temperature of the coolant has dropped below 110° C. then at step 1612 (FIG. 13B) an instruction is issued to close valve III and at step 1613 the temperature is ranged as shown. In the event that the temperature is within the range of target $+\alpha 1$ to target $-\alpha 2$ then no control command is issued while in the event that the instant coolant temperature is less than taget $-\alpha 2$ a command to stop the operation of fan 116 is issued (step 1614). On the other hand, in the event that the temperature is above a value of target $+\alpha 2$ then a command to energize the fan is generated at step 1615.

At steps 1617, 1618 and 1619 the level of the coolant in the coolant jacket adjusted to H1 and at step 1620 the level of coolant in the lower tank 118 is sampled. In the event that the level of coolant in the lower tank is above level H2 then the program recycles to step 1613 to permit the communication between the lower tank 118 and the reservoir 128 to be maintained for a little longer. Upon the level of coolant in the coolant jacket and lower tank both being returned to levels H1 and H2 respectively, a command to switch valve flow path B is issued at a step 1621 and the program returns.

Shut-Down Control Routine

In the event that the engine stops the current control routine is interrupted and at step 1701 the current fan and valve control data is removed from the CPU and at step a software clock "timer 9" is cleared ready for shut-down control. However, as it is possible that the engine may have simply stalled and is in the process of being restarted, the status of the ignition switch is sampled at step 1703. In the event that the ignition switch is still ON it is assumed that the engine has only temporarily stopped and the program flows to step 1704 wherein the fan and valve control data is retrieved from RAM and placed back in the microprocessor CPU. Following this the program returns and a suitable control program re-entered.

On the other hand, if the outcome of the ignition switch enquiry reveals that the switch is OFF (indicating that the engine has been deliberately stopped) the program flows to step 1705 wherein the instant coolant temperature is sampled. If the temperature is below 75° C. then it is possible to switch the cooling circuit to an open circuit condition by opening valve III (via de-energization) without encountering the problem wherein superatmospheric pressures cause violent discharge of excessive amounts of coolant and the program proceeds directly to step 1714 wherein the power to the control circuit and associated elements is cut-off.

However, while the temperature in the coolant jacket is still in excess of 75° C. it is deemed necessary to perform a "cool-down" control which involves ensuring that valve III is closed and that the fan 116 is operated intermediately (for example 10 seconds at at time) while simultaneously ensuring that the a minimum level of coolant is maintained in the coolant jacket to securely immerse the highly heated structure of the engine. As will be appreciated, upon one of (a) the pressure in the system becomming subatmospheric or (b) the temperature therein dropping to 75° C., the program will flow to step 1714 and the operation of the control system terminates.

What is claimed is:

1. In an automotive vehicle having a passenger compartment and an engine compartment:

an engine, said engine being disposed in said engine compartment and having structure which is subject to high heat flux;

a cooling system for removing heat from said engine; and a passenger compartment heating arrangement incorporated with said cooling system, said cooling system and said passenger heating arrangement comprising:

a coolant jacket disposed about said engine into which coolant is introduced in liquid form and allowed to boil;

a radiator fluidly communicated with said coolant jacket, said radiator being arranged to receive gaseous coolant produced by the boiling of the liquid coolant in said coolant jacket and condense same to its liquid form;

means for returning liquid coolant from said radiator to said coolant jacket in a manner which maintains the level of coolant in said coolant jacket at a first predetermined level, said first predetermined level being selected to immerse said strcture in a predetermined depth of liquid coolant;

a cabin heater disposed in said passenger compartment, said cabin heater including a core through which coolant may pass;

a first port formed in said coolant jacket at a level higher than said first predetermined level;

a second port formed in said coolant jacket at a level lower than said first predetermined level and proximate said structure;

a circulation pump in fluid communication with said core and said first and second ports, said pump being selectively energizable to pump coolant from said first port to said second port via said core during a first mode of operation and pump coolant from said second port to said first port via said core during a second mode of operation.

2. A vehicle as claimed in claim 1, further comprising a first parameter sensor which senses a parameter which varies with the temperature of the coolant in said coolant jacket, said pump being responsive to said first sensor for switching between said first and second modes.

3. A vehicle as claimed in claim 2, wherein said first port communicates with said radiator core via a first conduit and said second port communicates with said radiator core via a second conduit and wherein said circulation pump is disposed in one of said first and second conduits.

4. A vehicle as claimed in claim 3, wherein:

said coolant jacket, said radiator, said coolant return means, said first and second conduits and said radiator core define a cooling circuit; and which further comprises:

a reservoir the interior of which is maintained constantly atmospheric pressure;

valve and conduit means for selectively providing fluid communication between said cooling circuit and said reservoir; and a control circuit for controlling the operation of said valve and conduit means.

5. A vehicle as claimed in claim 4, further comprising a device disposed with said radiator for varying the rate of heat exchange between a cooling medium surrounding the radiator and said radiator.

6. A vehicle as claimed in claim 5, wherein said coolant return means includes:
  a first level sensor disposed in said coolant jacket at a first predetermined level, said first predetermined level being selected to be above the engine structure which is subject to high heat flux;
  a coolant return conduit leading from said radiator to said coolant jacket; and
  a coolant return pump disposed in said coolant return conduit, said coolant return pump being responsive to said first level sensor in a manner to pump liquid coolant from said radiator to said coolant jacket in response to said first level sensor indicating that the level of liquid coolant has fallen thereto.

7. A vehicle as claimed in claim 6, wherein said valve and conduit means includes a second level sensor, said second level sensor being disposed in a small collection vessel disposed at the bottom of said radiator.

8. A vehicle as claimed in claim 7, wherein said valve and conduit means further comprises:
  an overflow conduit leading from an upper section of said coolant jacket to said radiator;
  a first valve disposed in said overflow conduit, said first valve having a first position wherein communication between said coolant jacket and said reservoir is cut-off and a second position wherein communication between said coolant jacket and said reservoir is permitted;
  a second valve disposed in said coolant return conduit between said radiator and said coolant return pump;
  an induction conduit leading from said reservoir to said second valve, said second valve having a first position wherein communication between said radiator and said pump is established and a second position wherein communication between said radiator and said pump is interrupted and communication between said reservoir and said pump established;
  a fill/discharge conduit leading from said reservoir to said cooling circuit; and
  a third valve disposed in said fill/discharge conduit, said third valve having a first position wherein communication between said reservoir and said radiator is permitted and a second position wherein communication between said radiator and said cooling circuit is interrupted.

9. A vehicle as claimed in claim 8, further including a second parameter sensor for sensing a parameter which varies with load on said engine.

10. A vehicle as claimed in claim 9, wherein said control circuit includes means for:
  sensing the need for said passenger compartment heater to be put into operation;
  sensing the instant coolant temperature;
  energizing said circulation pump to pump in said first flow direction when the coolant temperature is below a predetermined level and in said second flow direction when the temperature of said coolant is above said predetermined level.

11. A vehicle as claimed in claim 10, wherein said control circuit further includes means for:
  sensing the load on said engine;
  determining a target temperature to which the coolant in said coolant jacket should be maintained for the given engine load;
  operating said device in manner to increase the amount of heat exchanged between the cooling medium surrounding the radiator and the said radiator.

12. A vehicle as claimed in claim 11, wherein said control circuit further includes means for:
  sensing the temperature of the coolant being below a second predetermined level;
  conditioning said valve and conduit means and said coolant return pump in a manner to induct coolant from said reservoir via said induction conduit and pump same into said cooling circuit and permit the excess coolant to overflow back to said reservoir via said overflow conduit and further conditioning said coolant circulation pump to circulate coolant through said core in said first flow direction in a manner which flushes non-condensible matter out of said cooling circuit.

13. A vehicle as claimed in claim 12, wherein said control circuit further includes means for:
  conditioning said valve and conduit means to introduce coolant from said reservoir to said cooling circuit in the event that the temperature of the coolant in said coolant jacket falling below a third predetermined temperature.

14. A vehicle as claimed in claim 13, wherein said control circuit further comprises means for:
  conditioning said valve and conduit means and said coolant return pump in response to the temperature being above a fourth predetermined temperature to:
  (i) induct coolant from said reservoir via said induction conduit and pump same into said coolant jacket in a manner to maintain the level liquid coolant therein at said first predetermined level;
  (ii) permit coolant to be discharged from said radiator via said fill/discharge conduit in a manner to reduce the pressure and temperature of the coolant in said cooling circuit.

15. A vehicle as claimed in claim 14, wherein said control circuit further includes means for:
  opening said first valve if the temperature in said cooling circuit remain above said forth predetermined temperature for a preselected period.

* * * * *